United States Patent [19]

Bhandarkar

[11] Patent Number: 5,356,447
[45] Date of Patent: Oct. 18, 1994

[54] MANUFACTURE OF HIGH PROOF-TEST OPTICAL FIBER USING SOL-GEL

[75] Inventor: Suhas D. Bhandarkar, Murray Hill, N.J.

[73] Assignee: AT&T Bell Laboratories, Murray Hill, N.J.

[21] Appl. No.: 29,753

[22] Filed: Mar. 11, 1993

[51] Int. Cl.⁵ .......................................... C03B 37/023
[52] U.S. Cl. ........................................ 65/395; 65/900; 65/901; 65/416; 65/427; 65/17.5
[58] Field of Search ................ 65/3.11, 3.12, 18.1, 65/18.3, 900, 901

[56] References Cited

U.S. PATENT DOCUMENTS

| | | | |
|---|---|---|---|
| 4,426,216 | 1/1984 | Satoh et al. | 65/18.1 |
| 4,707,174 | 11/1987 | Johnson et al. | 65/18.1 |
| 4,840,653 | 6/1989 | Rabinovich | 65/3.12 |
| 5,026,409 | 6/1991 | Robinson et al. | 65/3.11 |
| 5,185,020 | 2/1993 | Satoh et al. | 65/3.11 |

OTHER PUBLICATIONS

J. F. Knott, *Fundamentals of Fracture Mechanics*, Butterworths, London, pp. 98–105 (1973).

*Primary Examiner*—Robert L. Lindsay
*Attorney, Agent, or Firm*—George S. Indig

[57] ABSTRACT

Incidence of breakage in optical fiber drawn from sol-gel produced preforms is reduced by treatment of the still-porous glass by use of a chlorine-containing, oxygen-free gas mixture. Improved satisfaction of proof-rest requirements to at least 100 kpsi is assured by size reduction of unassimilated discrete particles in the fiber.

16 Claims, 2 Drawing Sheets

MANUFACTURE OF HIGH PROOF-TEST OPTICAL FIBER USING SOL-GEL

BACKGROUND OF THE INVENTION

1. Technical Field

The invention is concerned with the fabrication of silica-based optical fiber by drawing from preforms which include sol-gel produced glass. Early use will take the form of low-loss single-mode fiber prepared from composite preforms constituted of sol-gel produced overcladding tubes enclosing core rods prepared by usual fiber fabrication processes.

2. Description of the Prior Art

U.S. Pat. No. 5,240,488, issued Aug. 31, 1993 represents the breakthrough to finally realize the economy implicit in use of sol-gel prepared silica-based glass bodies. In one use, tubular bodies, together with cores prepared by soot processing or by Modified Chemical Vapor Deposition, make up the composite preforms from which optical fiber may be drawn. That patent application describes incorporation of an organic polymer in the sol to avoid cracking of the gelled body during drying. Polymer removal during firing results in final drawn fiber of quality commensurate with that produced by more expensive methods now in use. Near-net shape sol-gel bodies are expected to play a role in optical fiber manufacture in the near future.

CO-FILED PATENT APPLICATION

U.S. patent application Ser. No. 08/0297,50, reports the finding that inclusion of small numbers of small "refractory" particles in the sol-gel preform body prevents satisfaction of proof-test requirements for the drawn fiber. 0.8 μm particles of zirconia or other particulate material which does not dissolve into the silica at usual firing temperature, is found to cause breakage in 100 kpsi proof-testing. Manufacturing specifications require near-complete avoidance—define an acceptable level as low as two such refractory particles per megameter of fiber ($10^{-10}$ gram/30 kg $SiO_2$) or lower.

The finding is of little relevance to usual procedures for preform fabrication. Vapor transfer processes, whether by soot processing or by Modified Chemical Vapor Deposition, avoid the problem of particle containment internal to the glass. The sol-gel process which owes economic advantage to elimination of need for vapor transfer is susceptible. Satisfactory particle elimination from starting material, as by condensation from vapor, would eliminate this cost advantage.

This co-filed application, generically directed to avoidance of this problem peculiar to sol-gel, suggests centrifugation as an approach. Centrifugation is effective, particularly for particles of major fractions of a micrometer and larger. It is likely expected that centrifugation will be used in sol-gel fiber fabrication.

Sol-gel processing further aggravates the problem of small particle inclusion—this time due to sol contact with container walls, perhaps following centrifugation. Again, there is no vapor transfer to alleviate the problem.

SUMMARY OF THE INVENTION

Use of an oxygen-free, chlorine-containing ambient effectively removes break-inducing refractory particles from the unsintered preform body. Thionyl chloride, $SOCl_2$ as carried by He or $N_2$ combines with refractory oxide particles to eliminate meaningful particles in hours, e.g. $ZrO_2$ of encountered particle size combines to result in removal, ultimately as $ZrCl_4$, in a few hours. Molecular chlorine—still oxygen free—produces similar results although at reduced rate to require times an order of magnitude greater. Oxygen inclusion to levels above ppm's interferes with particle removal. Oxygen, e.g., for removal of organic contaminant, or, in accordance with prevalent practice, included with $Cl_2$ or $SOCl_2$ for water removal, may be incorporated in a separate step.

DETAILED DESCRIPTION

General Description of the Process

Figure 1:
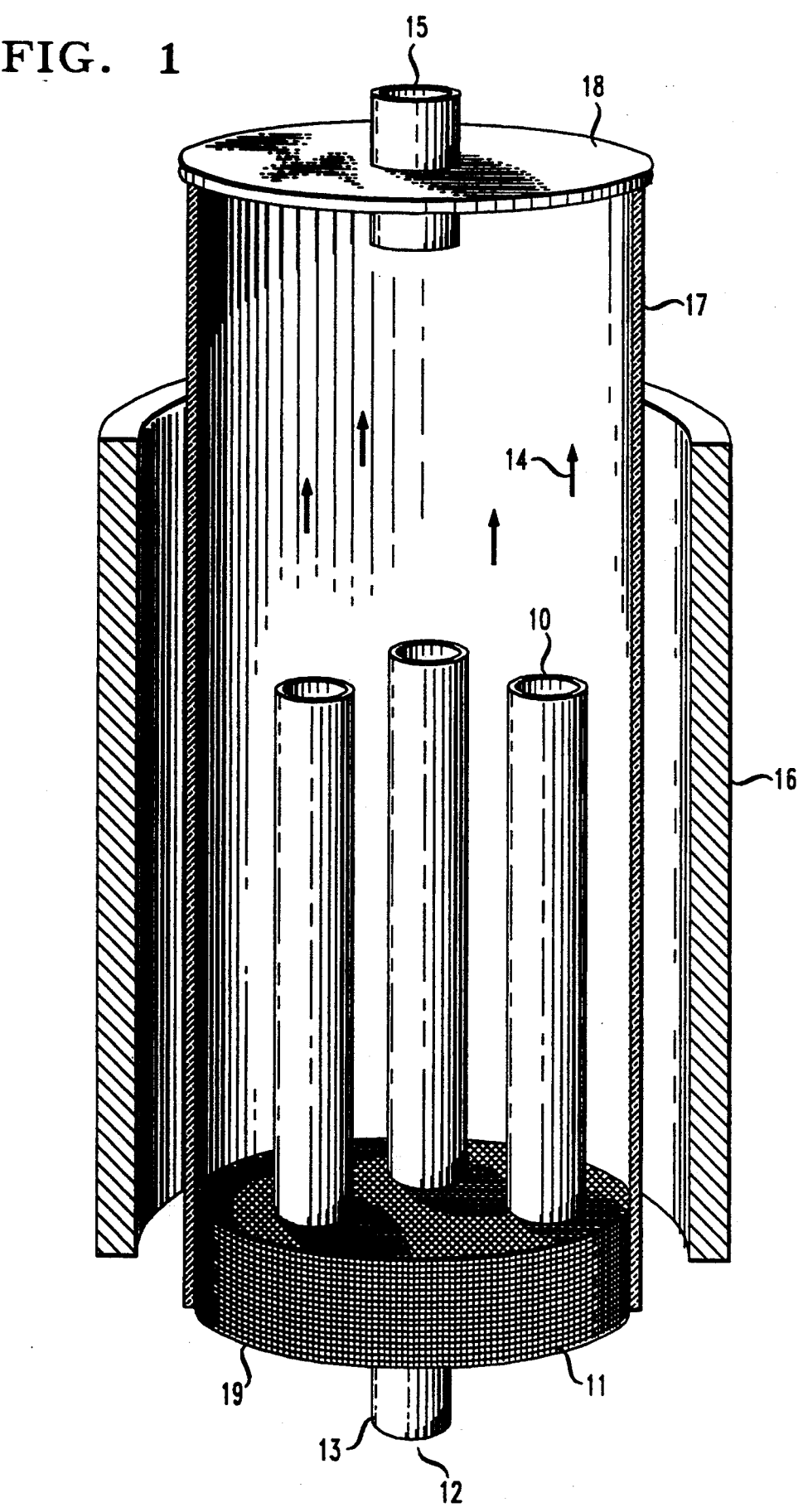
FIG. 1 is a perspective view, partly in section, of apparatus in use in the practice of the invention.

A. Process of U.S. Pat. No. 5,240,488

Description is based on use of the preferred chlorine-containing ingredient, $SOCl_2$ for gas removal of particles. Molecular chlorine or other chlorine-containing gas-phase material may be substituted as discussed further on.

Detailed conditions for a useful sol-gel process are set forth in U.S. Pat. No. 5,240,488. As practiced they consist of:

1. Preparing a mixture of 30–60 wt. % silica particles of 30–60 $m^2$/g surface area in water
2. Increasing pH to at least 9.5 by admixing 1–6 wt. % tetramethylammonium hydroxide, as based on $SiO_2$.
3. Admixing polymer to be removed during subsequent processing, e.g. with 0.05–1 wt. % polyethyloxazoline, as based on $SiO_2$
4. Admixing up to 10 wt. % glycerine, as based on $SiO_2$
5. Aging
6. Addition of gelation agent
7. Gelation
8. Drying of gelled body
9. Heating to remove volatiles
10. Dehydroxylation, e.g., by $Cl_2$–$O_2$ of the still-porous gelled body while heating
11. Sintering B. Particle Removal The particle removal step of this invention—"gas removal" is carried out prior to sintering. It is best carried out subsequent to any volatiles removal and any separate dehydroxylation step. Volatiles, if not first removed, may react with thionyl chloride to slow particle removal. It is found that oxygen-free thionyl chloride, as used in particle removal, may serve for dehydroxylation as well. While initial commercial practice is expected to depend upon use of conventional oxygen-containing ambient for dehydroxylation as a prior step, this finding may result in elimination of a separate dehydroxylation step.

Centrifugation of the ungelled sol in accordance with co-filed U.S. patent application, Ser. No. 08/029750, may be used prior to gas removal. Required time for the gas removal step is significantly reduced by centrifugation before gelation.

Centrifugation is commonly used in the pharmaceutical and specialty chemical industry. As applied here, it exploits the density and size differences between $SiO_2$ sol particles (density of 2.2 $\mu m/cm^3$, particle size <0.1 gm) and and encountered refractories, e.g., $ZrO_2$ (density >4.5 $gm/cm^3$, particle size >2 $\mu m$).

Typical operating conditions—centrifuging at 3200 g for 30 min. (g is gravitational acceleration at 1 arm.)—has proven sufficient for removal of $ZrO_2$ particles to at least 0.8 $\mu m$, with removal of less than 3.5% of $SiO_2$ in the sol. Calculations suggest removal to be effective down to size of 0.2 $\mu m$. (This is acceptable as applied to sols containing as little as 31% $SiO_2$—does not represent sufficient removal to result in excessive shrinkage or cracking.) The density and size variation between contaminant particles and $SiO_2$ results in 1500 to 90,000 times faster travel for contaminant. Particle size alone may be sufficient basis for differentiation—centrifugation is effective in removal of often-encountered large $SiO_2$ particle agglomerates—(agglomerates of $\approx 400$ or more sol particles below which they do not interfere with proof-test requirements up to $\approx 180$ kpsi).

GAS REMOVAL OF PARTICLES a. Class of Particles to be Removed

Particles of concern are refractory—are not assimilated into the glass during drawing. As commonly practiced, such particles do not melt below the $\approx 2000°$ C. used in drawing. $ZrO_2$, or $TiO_2$ particles have been found to be associated with 75% of fiber breaks. Removal of either requires freedom from oxygen in the ambient during gas removal. $Cr_2O_3$ and rare earth oxides of Er, Dy, Th, and Ce—may induce breaks. They are removed under conditions useful for the common contaminant particles. Other commonly encountered particles, such as $Al_2O_3$, are assimilated into the silica glass during drawing and are not break-nucleating. In any event, it, too, is removed in $O_2$-free ambient along with $ZrO_2$ and $TiO_2$.

Particle size of consequence is generally consistent with Griffith's Law. See, J. F. Knott, *Fundamentals of Fracture Mechanics*, Butterworths, London, pp. 98–105 (1973). As described in this reference, particle-induced breakage is characterized by a break surface that includes: a "mirror" encompassing the flaw; an intermediate "mist"; and, finally, a "hackle" consisting of break lines which converge on the flaw. Permitted particle size depends upon proof-test requirements—sustainable tensile force varies as the inverse of the square root of particle size. Removal of 0.8 $\mu m$ and larger particles avoids fiber breakage during 100 kpsi prooftesting. (While fiber diameter is not a first order criterion, conclusions reached are based on studies using state-of-the-art 125 $\mu m$ fiber.)

b. Gas Composition

Effective particle removal requires freedom from oxygen—preferably oxygen content at or below $10^{-4}$ vol % (1 ppm) based on the total gas composition. Oxygen content is critical for removal of $ZrO_2$ and $TiO_2$. Removal rate for $Cr_2O_3$ is less affected by oxygen—removal is essentially unaffected by as much as 80–90 vol % $O_2$. Since $ZrO_2$ and $TiO_2$ are prevalent contaminants, freedom from $O_2$ is necessary to the usual practice of the invention.

It is likely that $SOCl_2$ will be preferred as the prime or sole chlorine-containing ingredient. $SOCl_2$, is more effective than molecular chlorine and, thus far, appears unique. Explanation for effectiveness is likely related to presence of the moiety $SO^-$. For one thing, this reducing ion may extract small residual amounts of $O_2$. For another, it appears to make a significant contribution to the dissociative effect of the molecule. Experimental findings strongly suggest that particle removal may be due to $SO^-$ to an equal or greater extent than to released chlorine. Related halogen-containing compounds may serve to remove the refractory particles. Experimentation thus far has not identified anything of effectiveness equal to that of $SOCl_2$. Materials considered include $SOF_2$, $S_2OCl_4$, $S_2O_3Cl_4$, $SOBr_2$, $PCl_5$, $PCl_3$, and $BCl_3$. Some of these, e.g. the B- and P-containing compounds may dope the silica glass to result in unwanted change in refractive index. Still other materials which may be quite suitable do not lend themselves to ready experimentation—e.g. $SOF_2$ is quite unstable (instability likely increases reactivity so that in situ preparation might be justified). It is intrinsic that any cation will tend to aid in the requisite particle dissociation. Accordingly, so long as the halogen-containing compound dissociates to, in turn, cause dissociation of the particle compound, the freed cation, in combining with oxygen of the particle compound, increases rate of gas removal. There is one additional practical proviso—the nature of the cation should be such as to produce a gaseous reaction product upon reacting with oxygen under the conditions of gas removal.

Experimental work is based on use of He or $N_2$ carrier at 90–92 vol %. He has been found effective. $N_2$ may gain favor on a cost basis.

Particle removal is temperature dependent—increases with increasing temperature. Test work has been based on a temperature range of 850° C.–1,000° C. The maximum value should not be exceeded since it may result in sintering to reduce porosity, and thereby to reduce gas permeation. Lower temperatures reduce removal rate (see g. below).

c. Glass Composition

Sol-gel glass fabrication is particularly useful for higher melting compositions. Reference has been made to appropriate glass compositions as "silica-based". Optical fiber at this time is composed largely of silica—in excess of 95 wt. % $SiO_2$—with intentional additions for the purpose of modifying refractive index (for increasing core index or for decreasing clad index). Proposed variations contemplate addition of small amounts of lower melting alkali earth oxides amounts likely to a maximum of 5 wt. %, not likely to exceed 10 wt. %. All such compositions—"silica-based" glass compositions—are expediently prepared by sol-gel and are contemplated for use in this invention.

Melting temperature is of consequence in practice of the invention. Gas removal of particles requires porosity. It is essential that operations following gelation and prior to sintering be at sufficiently low temperature to avoid premature consolidation. The high-silica compositions now used in optical fiber—compositions of $\approx 99$ wt. % and higher silica—retain necessary porosity at temperatures within the 1100° C. 1200° C. Operation at or below 1000° C. is conservative. Possible future modification, taking the form of addition of up to 10 wt. % of alkali earth oxides, reduces sintering temperature. This maximum modification may dictate gas removal at temperatures as low as 700° C.

d. Porosity

Dried preforms examined are typically of 27 vol % porosity. Increased porosity—increased pore size and/or number to statistically more closely approach path continuity—results in better gas permeation to improve assurance against cracking.

e. Flow Conditions

FIG. 1 is a schematic representation of an appropriate furnace configuration. In this arrangement three gel tubes 10 are placed vertically on a platform 11 which is gridded to assure uniformity of gas flow. Chlorine-containing atmosphere 12 is introduced through port 13. Arrows 14 show the general direction of flow. Exiting atmosphere is released at port 15. Placement of this exit port at a distance of 25 inches or more from the topmost portions of tubes 10 served to avoid backflow as well as influx of moisture into the tubes. It is found experimentally that the upward flow arrangement shown is desirable. Downward flow has produced eddy currents to result in redeposition of $SiO_2$ formed by slight $SiO_2$-$SOCl_2$ reaction. Cristobalite, the observed form of redeposited $SiO_2$, has itself been found to nucleate cracks.

The apparatus shown is completed by heating coils 16 about silica muffle tube 17 and by muffle ends 18 and 19.

In experimental work $SOCl_2$ introduction has been in excess of that required for stoichiometric particle removal. A gas composition found useful consisted of 0.08–0.1 arm $SOCl_2$, remainder He or $N_2$, to total 1 atm.

f. Time

Figure 2:
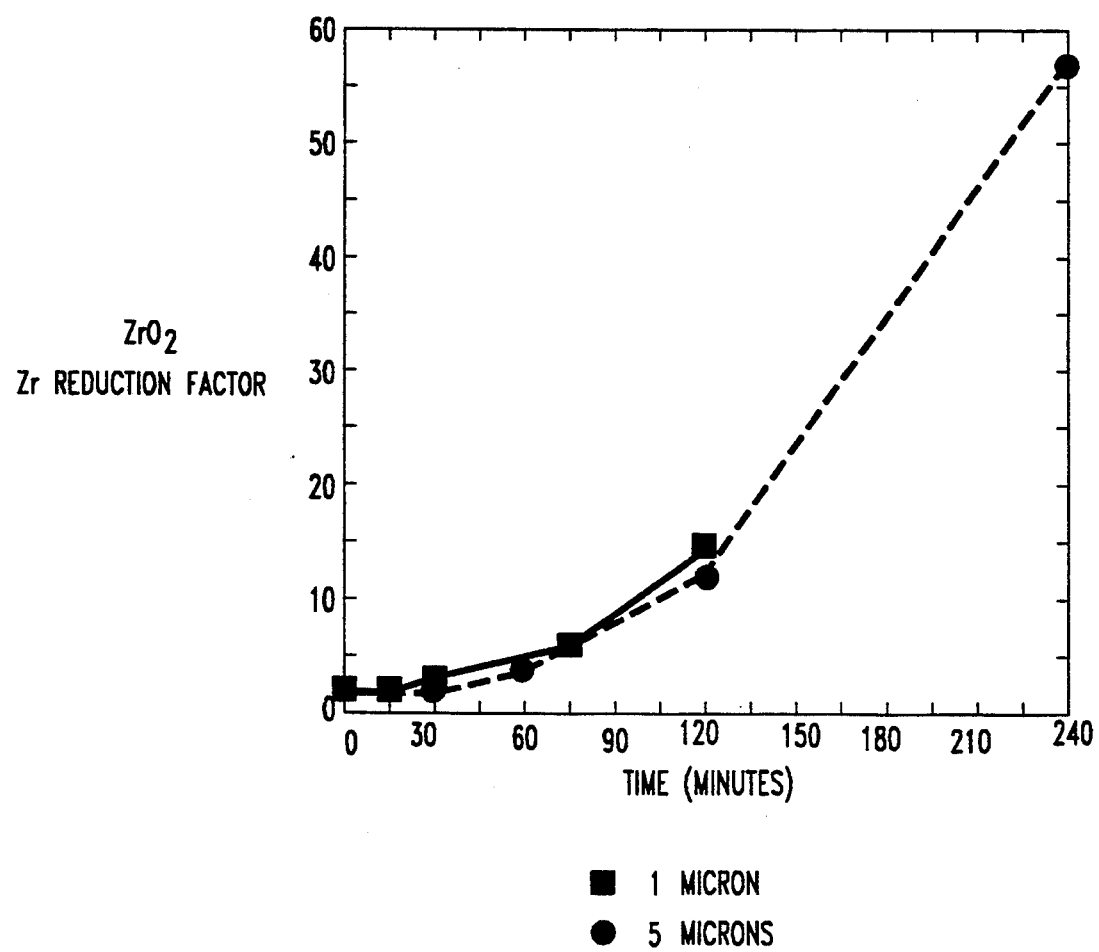
FIG. 2 on coordinates of percent reduction in Zr on the ordinate and time on the abscissa is a plot showing relationship of those two parameters for two different sizes of zirconia particles.

FIG. 2 is a plot showing the relationship of refractory removal to time for a flow rate of 400 cc He and 40 cc $SOCl_2$. Ordinate units are percentage Zr reduction—equivalent to percentage $ZrO_2$ reduction. Abscissa units are time in minutes.

An interesting observation is reported. Under the conditions studied, removal rate of Zr was substantially unaffected by particle size. The curve points represent 1 $\mu$m particles (squares) and 5 $\mu$m particles (circles). An explanation postulates grain boundaries which are readily permeated or attacked to leave small crystallites of similar surface area for time determinant. Residual particle size rather than weight removal rate is the criterion. Removal to result in particle size reduction from an initial size of 1.0 $\mu$m to a final size of 0.2 $\mu$m took about three hours. Removal to result in retained particles of this size from 5.0 $\mu$m initial particles is related approximately as the cube power of size—will take about 25 times as long. The prior centrifugation of U.S. Application Ser. No. 08/029750 is time effective—under described conditions it has effectively removed particles greater than 1 $\mu$m to significantly reduce time required for $SOCl_2$ removal.

g. Temperature

Table 1 shows the effect of temperature on $ZrO_2$ particle removal. Gas removal in all instances was at a flow rate of 400 cc He/min. and 40 cc $SOCl_2$/min (to yield a gas composition of 90% He, 10% $SOCl_2$). Decreasing temperature from the maximum tabulated value of 1,000° C. to the minimum tabulated value of 500° C. reduced rate of removal by 50%. Information in the Table is based on experiments in which 5 gram samples of 1 $\mu$m particles of zirconia contained in an open silica crucible were exposed to 500 cc/min flow rate of a gas mixture consisting of 10 vol $SOCl_2$ remainder He. In each instance, flow was continued for a period of one hour at the termination of which crucible and contents were weighed. There was no measurable loss of crucible material.

TABLE 1

| T(°C.) | Effect of Temperature Relative Zr Removal Rate |
|---|---|
| 1000 | 1 |
| 900 | 1 |
| 750 | 0.76 |
| 500 | 0.50 |

A useful temperature range is 1,000° C.–400° C.

EXPERIMENTAL PROCEDURE

An effective procedure for making sol-gel tubes for reported experimental work is described in U.S. Pat. No. 5,240,489 and is summarized under "General Process Description" above. In certain experiments, refractory particles of $ZrO_2$, $TiO_2$ and $Cr_2O_3$ were added to the sol. Characterization of the gel after gas removal of particles was by direct analysis of impurity content before and after treatment, or by drawing and testing of resulting fiber. Since the critical amount of residual particulate matter is very small, most discriminating test was by fiber break count.

Samples were placed in a furnace at appropriate temperature. After initial experimentation to develop the information set forth in the Table, a standard temperature within the 900° C.–1000° C. range was maintained. Carrier—in most instances, He—was bubbled through $SOCl_2$ and the resulting saturated carrier mixture was passed over the sample. Types of samples investigated included: undoped gels; gels doped with known amounts of refractory powders; and pure refractory powders. Doped gel samples were heated slowly to 1000° C. so as to evaporate most of the water and to burn out organics. Gels were analyzed by X-ray fluorescence and/or by energy dispersive spectrum analysis (by e-beam excitation). Final determination was by examination of breaks resulting in drawn fiber.

Prior to gas extraction, gel samples were heated to 500° C. in air to remove organics.

EXAMPLES

EXAMPLE 1

A 5 gram sample of $ZrO_2$ powder was placed in a crucible and was exposed to flowing $SOCl_2$, 10 vol. %—He, remainder at a flow rate of 500 cc/min at a temperature of 1000° C. The powder disappeared within a period of three hours.

EXAMPLE 2-5

Aqueous sols containing 46 wt. % $SiO_2$ particles of mean diameter 50 nm were doped with particles of refractory material, were gelled and dried to produce gel bodies from which samples of 2 cm $\times$ 2 cm $\times$ 1 cm were prepared. Samples were placed in a silica boat, were heated to 1000° C., and were exposed to flowing ambient of 10 vol.% $SOCl_2$, remainder He. Ambient was $O_2$-free—oxygen content was below 1 ppm.

EXAMPLE 2

A sample containing 500 ppm of 1 $\mu$m particles of $ZrO_2$ was exposed to yield data reported on the 11 $\mu$m curve of FIG. 2. 94 wt. % reduction of $ZrO_2$ after three hours corresponds with retained particles of 0.4 $\mu$m to yield fiber without particle-nucleated breakage under 150 kpsi proof-testing.

EXAMPLE 3

A sample as described in Example 2 but doped with 500 ppm of 1 μm particles of $TiO_2$ was exposed for a period of three hours. The reduction factor for $TiO_2$ was the same as reported for $ZrO_2$ on FIG. 2—approximately 97% based on weight removal of the element.

EXAMPLE 4

The experiment of Example 3 was repeated but as doped with 500 ppm of 1 μm particles of $Cr_2O_3$. An exposure period of three hours under the same flow conditions resulted in approximately the same weight removal for Cr.

EXAMPLE 5

Example 2 was rerun but with a sample doped with 5.0 μm $ZrO_2$ particles. Results are reported on the plot of FIG. 2. While this sample was not drawn, based on other experimental results, freedom from breaks upon 100 kpsi proof-testing would be expected to require considerably more time than the three hours reported in Example 2. Based on simple surface area dependence it would be expected to require times approximately 125 times greater.

EXAMPLES 6–8

A gel rod produced from a sol as described but doped with 2 wt. % of 1 μm $ZrO_2$ particles was placed in the bore of an undoped gel tube and sealed off at both ends. The rod sample was 17 mm diameter × 50 mm length; the tube was of 55 mm OD, 20 mm ID, 200 mm length. The purpose of these examples was to establish rate of ambient transport through the 15 mm tube wall. Results are in tabular form.

TABLE 2

| Example | Temp (°C.) | $SOCl_2$ Conc. | Bubbler Temp(°C.) | $SiO_2$ Removed | Zr Removal as a Fraction Initial Conc/Final Conc |
|---|---|---|---|---|---|
| 6 | 900 | 12% | 40 | 7.7% | 50 |
| 7 | 900 | 25% | 60 | 13.5% | 200 |
| 8 | 750 | 80% | >150 | 15.17% | >$10^5$ |

The 25 vol. % and 80 vol. % $SOCl_2$ concentration of Examples 7 and 8 may prove unwieldy. In all instances, flow was continued for a period of 18 hours. Noted Zr removal corresponds with final particle size of 0.27 μm, 0.17 μm and 0.02 μm, respectively. These and other like experiments, taken together with data of the other Examples (in which the refractory-containing sample was directly exposed), established refractory particle removal to be diffusion limited.

EXAMPLES 9–11

These Examples are representative of experimental results designed to show relative effects of centrifugation and gas treatment. In all three Examples, fiber was drawn from a composite preform constituted of sol-gel overcladding encompassing an MCVD-prepared core. In all instances the preform consisted of a 15.5 mm diameter preform rod within a 40 mm OD × 16 mm ID gel tube. Drawing conditions were uniform.

EXAMPLE 9

In this experiment, fiber was drawn from a preform including a sol-gel overcladding without either centrifugation of sol nor gas treatment of gel. Cracking interfered with drawing. A 0.2 km sample showed two particle-induced breaks at 20 kpsi proof-testing. Responsible particles, one of $ZrO_2$, the other of $Cr_2O_3$ were greater than 6 μm.

EXAMPLE 10

A sol identical to that used in Example 9 was centrifuged for one hour with acceleration force of 3200 g and was processed to yield an overcladding tube. A composite preform, as described, was drawn to result in a 10 km sample which, as proof-tested at 60 kpsi resulted in nine breaks of particle-origin. All break surfaces revealed submicron $ZrO_2$ particles.

EXAMPLE 11

A preform as described in Example 10, was prepared from a gel tube treated for four hours in 10%–90% mixture of $SOCl_2$, and He at 1000° C. A nine-kilometer fiber was proof tested at 150 kpsi without breakage.

Discussion as well as Examples have been directed to the first likely commercial adaptation of sol-gel fiber fabrication—that based on fiber drawing from a composite preform constituted of a sintered sol-gel tube containing an inserted core rod. The advance is applicable to alternative composite preform structures including those in which the tube is sintered about an already-contained core rod, as well as to procedures in which the overcladding is gelled about the rod. Equivalent results require increasing exposure time to gas ambient or making other provision for the increased path length resulting from blockage of the inner surface of the sol-gel body. The advance is of value in reducing fiber breakage in fiber drawn from all such composite preforms as well as from preforms which are solely sol-gel derived.

I claim:

1. Process for fabrication of optical fiber in accordance with which fiber is drawn from a preform comprising a sol-gel derived glass body, in which the body is prepared by gelation of a sol followed by drying to a porous body and finally by sintering.
   characterized in that the still-porous body is subjected to a particle-removal step in which the body is heated and maintained at elevated temperature below the sintering temperature, and is exposed to a flowing halogen-containing gas mixture which is substantially free of oxygen whereby refractory particles react with the gas mixture to yield gaseous reaction product and thereby to reduce particle size with consequent reduction in incidence of particle-nucleated fiber breaks, and in which the gas mixture as introduced contains $SOCl_2$.

2. Process of claim 1 in which fiber is drawn from a composite preform and in which the sol-gel body serves as overcladding.

3. Process of claim 2 in which the body is a discrete overcladding tube and in which the preform consists essentially of the tube and an enclosed core section.

4. Process of claim 3 in which the composite preform consists essentially of a core section prepared by a vapor transport process within such overcladding tube.

5. Process of claim 4 in which the core section is prepared by modified chemical vapor deposition.

6. Process of claim 4 in which the core section is prepared by a soot process.

7. Process of claim 6 in which the core section is prepared by vapor axial deposition.

8. Process of claim 6 in which the core section is prepared by outside vapor deposition.

9. Process of claim 1 in which the body contains at least 90 wt. % silica.

10. Process of claim 9 in which the body contains at least 95 wt. % silica.

11. Process of claim 1 in which refractory particles include particles of at least one composition selected from the group consisting of $ZrO_2$ and $TiO_2$.

12. Process of claim 1 in which the particle-removal step is preceded by a prior elevated-temperature gas treatment step in which the body is heated and maintained at elevated temperature, and is exposed to a flowing halogen-containing gas mixture which differs in composition from that of the particle-removal stop.

13. Process of claim 12 in which the prior gas treatment comprises dehydroxylation.

14. Process of claim 13 in which the gas mixture contains an inert carrier gas selected from the group consisting of He and $N_2$.

15. Process of claim 10 in which undesired particulate matter contained in the sol is mechanically separated and removed.

16. Process of claim 15 in which undesired particulate matter differs from desired sol particles in at least one characteristic selected from the group consisting of mass and size.

* * * * *